United States Patent [19]
Kanayama

[11] Patent Number: 5,356,650
[45] Date of Patent: Oct. 18, 1994

[54] PROCESS FOR PRODUCING SOLID HONEY

[75] Inventor: Taizo Kanayama, Tokyo, Japan

[73] Assignee: Bee K Co., Ltd., Tokyo, Japan

[21] Appl. No.: 798,057

[22] Filed: Nov. 27, 1991

Related U.S. Application Data

[63] Continuation of Ser. No. 474,454, Feb. 2, 1990, abandoned.

[30] Foreign Application Priority Data

Feb. 9, 1989 [JP] Japan .................................. 1-30395

[51] Int. Cl.$^5$ .......................... A23L 1/08; A23L 3/40; A23P 1/10; B65B 25/06
[52] U.S. Cl. ................................. 426/396; 426/414; 426/658; 426/515; 426/811; 426/465; 127/29; 127/30; 127/42
[58] Field of Search ............... 426/658, 414, 120, 811, 426/389, 130, 108, 112, 465, 472, 443, 515; 127/29, 30, 34, 42, 46.1

[56] References Cited

U.S. PATENT DOCUMENTS

| | | | |
|---|---|---|---|
| 752,359 | 2/1904 | Reed | 127/30 |
| 1,694,680 | 12/1928 | Burton et al. | 426/658 |
| 1,892,902 | 1/1933 | Rasky | 426/658 |
| 1,908,454 | 5/1933 | Snider | 426/658 |
| 2,021,450 | 11/1935 | Hampton | 127/30 |
| 2,690,972 | 10/1954 | Bradshaw | 426/658 |
| 2,693,420 | 11/1954 | Straub | 426/658 |
| 2,745,752 | 5/1956 | Peters | 426/130 |
| 2,749,245 | 6/1956 | Peters | 426/130 |
| 2,890,122 | 6/1959 | Katon | 426/112 |
| 2,917,216 | 12/1959 | Despres | 426/108 |
| 2,955,044 | 10/1960 | Tupper | 426/120 |
| 3,879,567 | 4/1975 | Verner | 426/658 |
| 4,004,040 | 1/1977 | Puta | 426/658 |
| 4,027,043 | 5/1977 | Schroeder et al. | 426/658 |
| 4,171,386 | 10/1979 | Skoch et al. | 426/658 |
| 4,221,818 | 9/1980 | Schroeder | 426/658 |
| 4,420,496 | 12/1983 | Hanson et al. | 426/811 |
| 4,472,450 | 9/1984 | Platt et al. | 426/658 |
| 4,532,143 | 7/1985 | Brain et al. | 426/658 |
| 4,849,019 | 7/1989 | Yasukawa et al. | 426/811 |
| 4,875,620 | 10/1989 | Lane | 426/108 |
| 4,919,956 | 4/1990 | Bateson et al. | 426/658 |

FOREIGN PATENT DOCUMENTS

| | | | |
|---|---|---|---|
| 515382 | 8/1955 | Canada | 426/414 |
| 2302333 | 8/1973 | Fed. Rep. of Germany | 426/658 |
| 52-12109 | 4/1977 | Japan . | |
| 1378104 | 12/1974 | United Kingdom . | |

OTHER PUBLICATIONS

Food Technology vol. XIV, No. 8, pp. 387-390 Turkot et al.

*Primary Examiner*—Steven Weinstein
*Attorney, Agent, or Firm*—Young & Thompson

[57] ABSTRACT

There is disclosed a process for producing solid honey wherein pure honey is subjected to dehydration in a vacuum evaporator with gradual temperature rise in a temperature range from ordinary temperature to 40°-90° C. within about one hour. The resultant concentrated pure honey is transported by pressure to a pouring part for supplying to a determined forming mold. In the meantime, heat-resistant plastic package containers which constitute determined forming molds are successively transported to the position of the pouring part, and the concentrated pure honey is charged to inside of the forming molds of the containers after a determined amount of edible fats and oils is previously applied. Spontaneous cooling then occurs followed by sealing up with a cover of an aluminium foil or a non-hygroscopic sheet at the side of opening part of the container. There is also disclosed a solid honey obtained by the process.

1 Claim, 2 Drawing Sheets

PROCESS FOR PRODUCING SOLID HONEY

This application is a continuation of U.S. application Ser. No. 07/474,454, filed Feb. 2, 1990, now abandoned.

FIELD OF THE INVENTION

The present invention relates to a solid honey and a process for producing it which is constructed in such a way that solidification is performed maintaining the composition standard of pure honey, so as to construct to be convenient for carrying and using as health foods, luxury goods or seasonings.

BACKGROUND OF THE INVENTION

Conventionally, as a production method for this kind of solid honey, such one is known which is constructed in such a way that pure honey is introduced into a vacuum evaporator and concentrated by dehydration within about one hour in a temperature range of 40–60° C. at which the composition standard thereof is not damaged, immediately after which molding by compression is carried out (Japanese Patent Publication No. 52-12109).

It is known that the solid honey produced by such way may be solidified maintaining the composition standard of pure honey, in which minerals and vitamins in honey are not damaged as described in the International Honey Standards proposed by WHO (the World Health Organization), and that this honey is useful as an alkaline food of high calorie content.

However, in the conventional production process of solid honey described above, the temperature range during the heating for dehydration is 40°–60° C., so that the obtained solid honey after forming by compression is soft and easily becomes sticky, which results in problems not only of poor mold release characteristics and high rate of occurrence of inferior goods but also of a rapid hygroscopic state that occurs during the period from production step to packaging step, which is not suitable for a long period of storage.

Thus, in the conventional production process of solid honey, heating temperature during dehydration is restricted resulting in insufficient dehydration, so that a compression operation is needed to be added for forming. Moreover, moisture resistance during the period from mold release of product to packaging is incomplete resulting in rapid moisture absorption, so that products produced thereby suffer deterioration, and there are many problems from the aspect of apparatus as well as workability.

SUMMARY OF THE INVENTION

Thus, the object of the present invention is to provide a solid honey and a process for producing it wherein the composition standard of pure honey may be maintained using a treating condition of dehydration in a relatively short period even if the conventional restriction temperature range is exceeded, moreover simultaneous molding and packaging is carried out after directly charging the dehydrated pure honey to a heat-resistant plastic package container to improve moisture absorption property and to improve workability, so that increase in quality may be realized.

A process for producing solid honey according to the present invention is characterized in that pure honey is subjected to dehydration in a vacuum evaporator with temperature rise in a temperature range from ordinary temperature to 40°–90° C. within about one hour, resultant concentrated pure honey is transported by pressure to a pouring part for supplying to a determined forming mold, in the meantime heat-resistant plastic package container which constructs determined forming molds is successively transported to the position of said pouring part, said concentrated pure honey is charged to inside of the forming molds of the containers after a determined amount of edible fats and oils is previously applied, and then spontaneous cooling is performed followed by sealing up with a cover of an aluminium foil or a non-hygroscopic sheet at the side of opening part of said container.

And a solid honey according to the present invention is characterized in that it is contained in a package container, which is constructed by previously applying a determined amount of edible fats and oils to inside of a forming mold of a heat-resistant plastic package container which constructs a determined forming mold, thereafter charging concentrated pure honey obtained after dehydration in a vacuum evaporator with gradual temperature rise in a temperature range from ordinary temperature to 40°–90° C. within about one hour, and performing spontaneous cooling followed by sealing up with a cover of a aluminium foil or a non-hygroscopic sheet at the side of opening part of said container.

According to the production process of the present invention, gradual temperature rise is carried out in a temperature range from ordinary temperature to 40°–90° C. within about one hour during dehydration of pure honey in a vacuum evaporator, so that the period of time thereof is short even at a temperature such as 60° C. Or more, whereby achieving efficient concentrating without damaging the composition standard of pure honey.

Alternatively, resultant concentrated pure honey is charged to inside of a forming mold of a container after a determined amount of edible fats and oils (for example palm oil) is previously applied during solidification thereof, and then spontaneous cooling is performed followed by sealing up with a cover of an aluminium foil or a non-hygroscopic sheet, whereby it may be achieved that moisture absorption of products is effectively avoided and workability is improved, moreover productivity and increase in quality of solid honey may be achieved with ease.

In these figures, 10 is a heat-resistant plastic container, 12 a substrate part, 14 a concave-shaped part, 16 a solid honey, and 18 an aluminium foil (non-hygroscopic sheet).

PREFERRED EMBODIMENT OF THE INVENTION

The examples of the solid honey and the process of producing it according to the present invention will be explained in detail hereinafter with reference to accompanying drawings.

Figure 1:
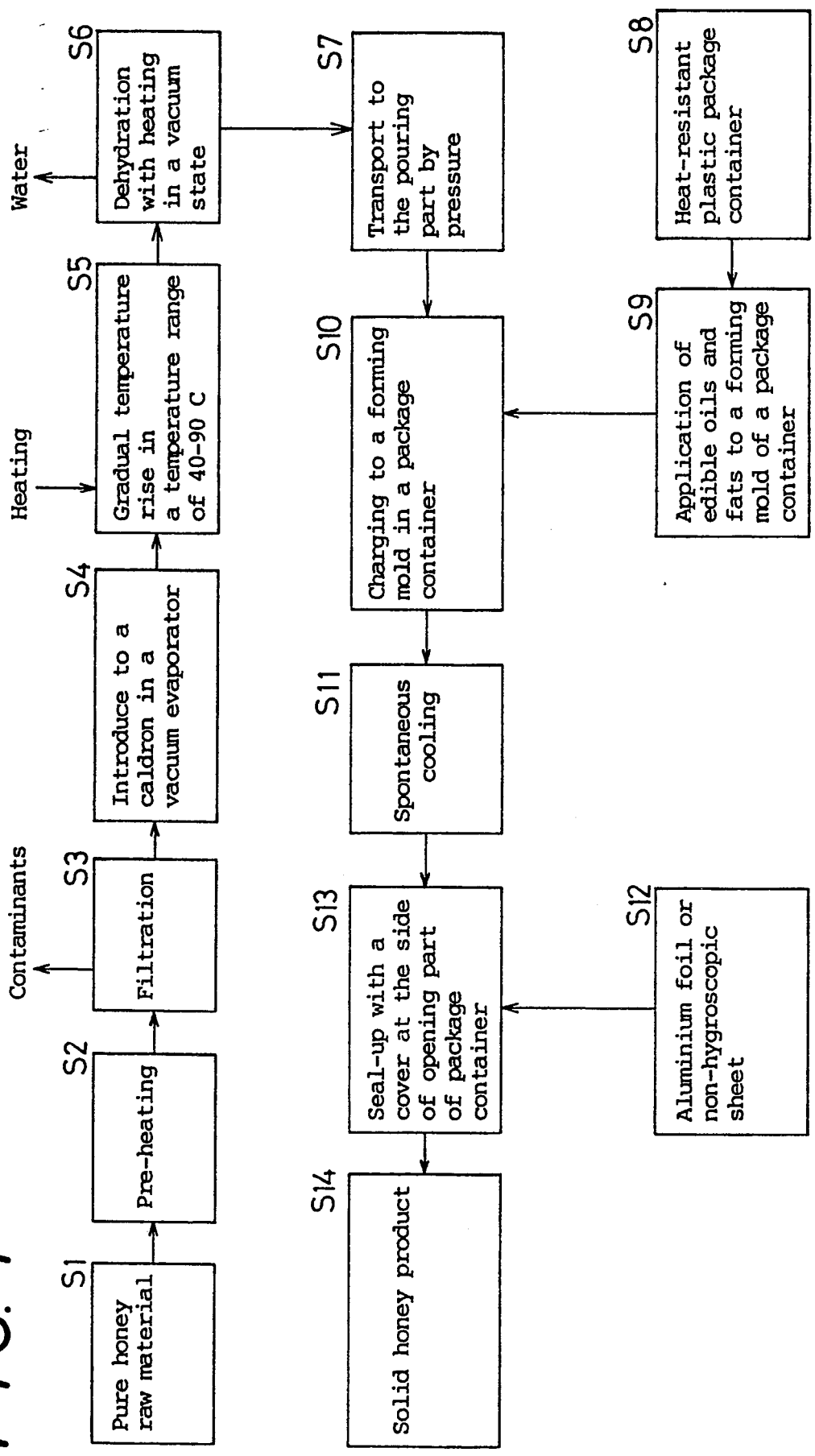
FIG. 1 is a figure showing an example of production step of the solid honey according to the present invention.
Figure 2:
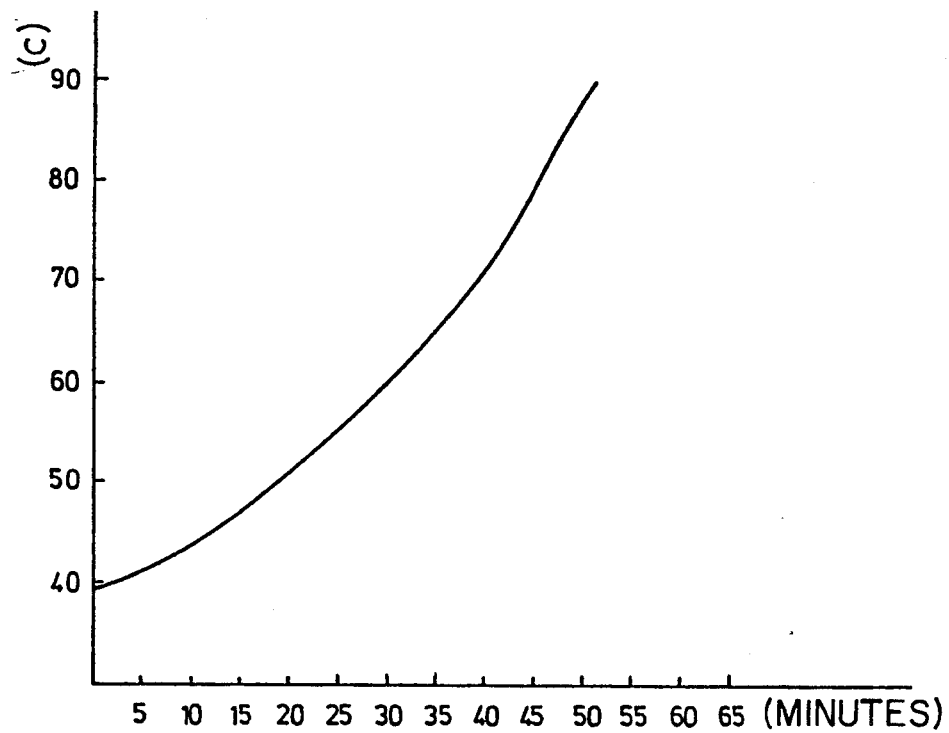
FIG. 2 is a characteristics diagram showing an example of heating-temperature and dehydration operation when dehydration is performed in the process of the present invention.

FIG. 1 is a figure showing an example of production step of the solid honey according to the present invention. As shown in FIG. 1, in the process of the present invention, at first a pure honey raw material (S1) Is suitably pre-heated to a suitable temperature (about 35°–40° C.) (S2) in which a suitable fluidized state is achieved in a heating caldron, after which contaminants in the honey raw material are removed by passing through a filtering apparatus (S3). Then, pure honey from which contaminants are removed is introduced into a concentrating caldron of a vacuum evaporator (S4), followed by gradual temperature rise by heating in a temperature range of 40°–90° C. (S5). At this time, when the temperature of pure honey becomes higher than a predetermined temperature, dehydration is started (S6) by making said concentrating caldron a vacuum state (about 73–74 cmHg). Thus, after performing dehydration for about one hour the vacuum state is released to complete dehydration. As a result thereof, in said concentrating caldron, pure honey is obtained which is concentrated to about 91–95 degree as a result of determination with a saccharinity (in general sugar degree of honey is about 77–80 degree). In addition, an example of operation state of heating temperature and dehydration in said concentrating caldron in the vacuum evaporator is shown as described in FIG. 2.

Figure 3:
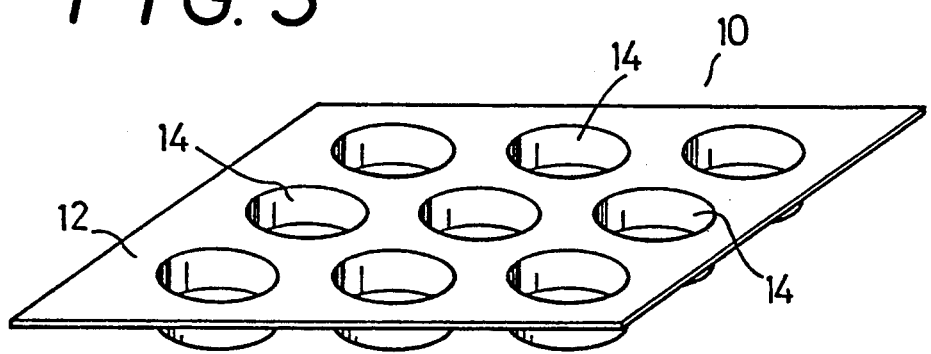
FIG. 3 is a perspective illustration in which an example of the heat-resistant plastic package used in the process of producing solid honey according to the present invention.

The concentrated pure honey thus obtained is transported by pressure from said concentrating caldron to a pouring part for pouring into a forming mold after optionally subjecting to anti-foaming and adjustment of liquor temperature (S7). However, in the present invention, the forming mold is constructed with a non-hygroscopic heat-resistant plastic package container 10, for example, as shown in FIG. 3. Namely, this heat-resistant plastic package container 10 is constructed in such a way that plural concave-shaped parts 14 are integrally formed in a rectangular substrate 12. A series of heat-resistant plastic package containers 10 constructed as above are successively supplied to a pouring part (S8). Thus, the position of the package container 10 is determined at said pouring part, and edible fats and oils which are suitable as foods such as palm oil are equivalently applied by means such as spraying when the concentrated pure honey is charged to the inside of the concave-shaped part 14 (S9). In such procedure, concentrated pure honey is charged to inside of the concave-shaped part 14 of said package container. In this case, the edible fats and oils applied inside of said concave-shaped part 14 function effectively in that adhesion of concentrated pure honey in a high temperature charged to inside of the concave-shaped part 14 is prevented to maintain mold release characteristics.

Figure 4:
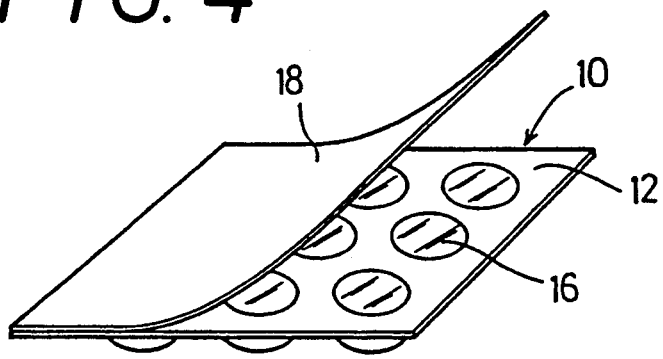
FIG. 4 is a figure which explains a state wherein the package container of FIG. 3 is sealed up with a cover.

As described in the above, the package container 10 in which concentrated pure honey is charged in the concave-shaped part 14 is exactly subjected to spontaneous cooling at ordinary temperature to gradually cool the concentrated pure honey in the concave-shaped part 14 to solidify. As a result thereof, solid honey with a stable quality is produced. Then, to the side of the opening part wherein solid honey 16 is thus molded and contained, an aluminium foil or a non-hygroscopic sheet for cover 18 is supplied (S12), which is subjected to sealing up with a cover at the side of opening part of said package container 10 by means such as adhesive fusion by heat (S13) [see FIG. 4]. Therefore, the package container 10 whose open part is sealed up with a cover may be commercially available exactly as a solid honey product (S14) or after further packaging.

As shown from the examples described above, according to the present invention, gradual temperature rise is performed in a temperature range from ordinary temperature to 40°–90° C. For about one hour, whereby efficient concentrating may be achieved without damaging the composition standard of pure honey as regards for example minerals and vitamins.

Alternatively, in the present invention, the non-hygroscopic heat-resistant plastic package container is used, which package container is simultaneously used as a forming mold for forming solid honey, whereby operation from forming of solid honey to packaging may be carried out consistently, so that workability is improved and productivity is increased. In particular, in this case, immediately before charging concentrated pure honey in the forming mold of said package container, edible fats and oils are applied homogeneously to inside of said forming mold, whereby mold release character is of solid honey from package container may become good to increase the quality of solid honey. Moreover, the package container in which solid honey is formed and contained may serve in such a way that the opening side thereof is sealed up with a cover of aluminium foil or a non-hygroscopic sheet after cooling, so that rapid and clean production of solid honey may be realized.

In the above, preferred examples of the present invention were explained, however, it is a matter of course that the present invention is not limited to the above-described examples, and that various changes in construction are possible within a range without departing from the spirit of the present invention.

What is claimed is:

1. A process for producing solid honey, comprising: pre-heating a raw honey to a temperature of about 35°–40° C. In a heating caldron; filtering the pre-heated raw honey to produce a pure honey; dehydrating the pure honey in a concentrating caldron received within a vacuum evaporator under vacuum for a period of about one hour, while gradually and continuously raising the temperature of the pre-heated pure honey during said period from an initial temperature of about 40° C. To a final temperature of about 90° C., according to the heating curve shown in FIG. 2, to concentrate said honey to a saccharinity reading of about 91–95 degree; transporting the resultant concentrated pure honey by pressure to a pouring implement; pouring the heated concentrated pure honey into containers comprising a molding cavity having applied thereto a predetermined amount of palm oil effective to prevent adhesion of the concentrated pure honey to said molding cavity; allowing the honey to cool and solidify within the molding cavity to form a solid honey having a shape defined by the molding cavity; and sealing the containers with a sheet of non-hygroscopic material so as to seal solidified pure honey in the container.

* * * * *